March 18, 1958 L. COOK 2,827,020
HYDRAULIC VALVE POSITIONING SYSTEM WITH
VALVE POSITION FEEDBACK
Filed Oct. 11, 1956 4 Sheets-Sheet 4
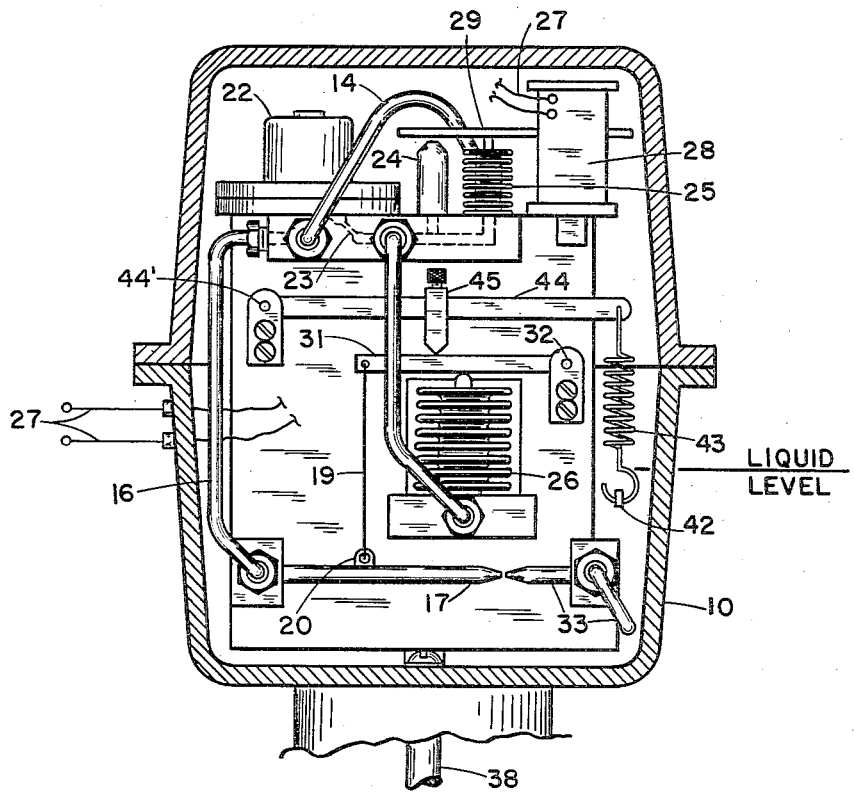
FIG. IV
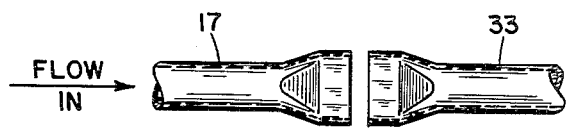
FIG. V
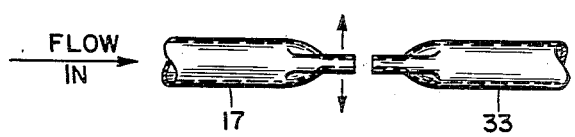
FIG. Va
INVENTOR
LYMAN COOK
BY
Lawrence H. Poston
AGENT

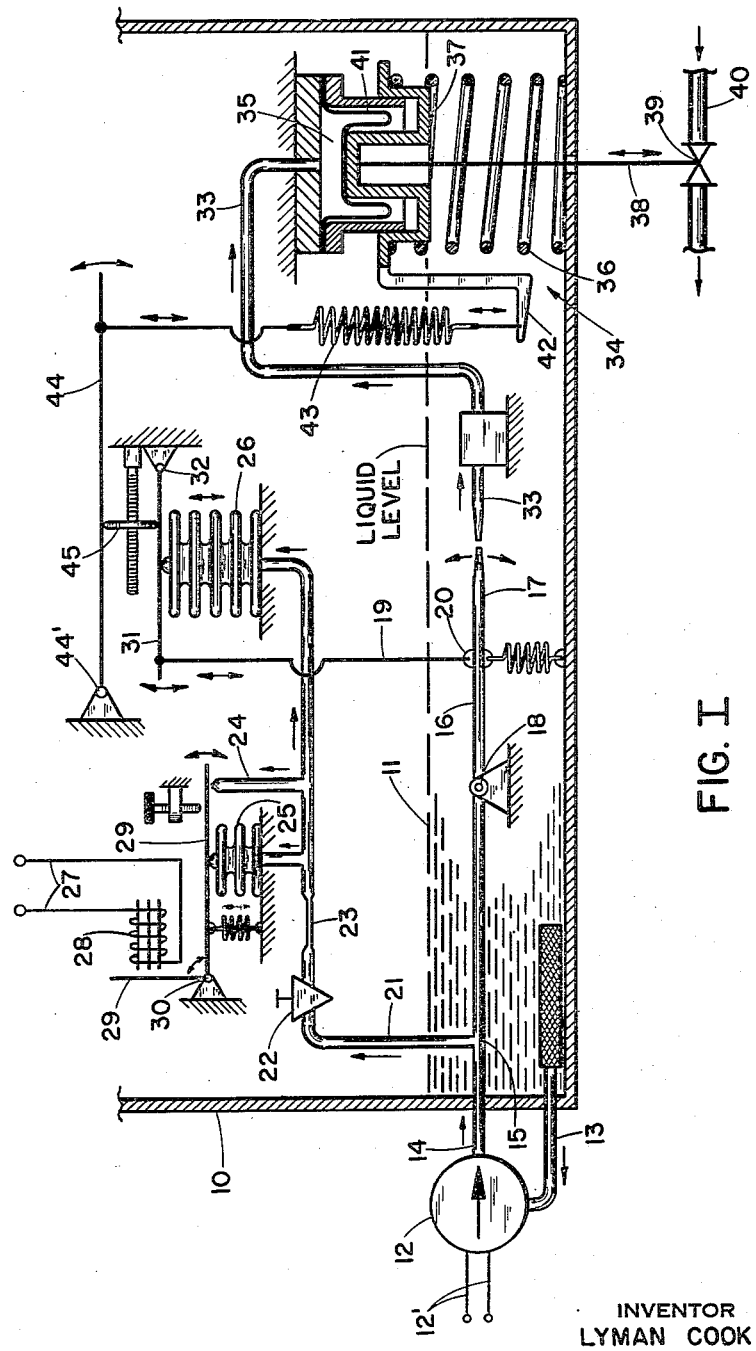
FIG. I
INVENTOR
LYMAN COOK
BY
Lawrence H. Paeton
AGENT

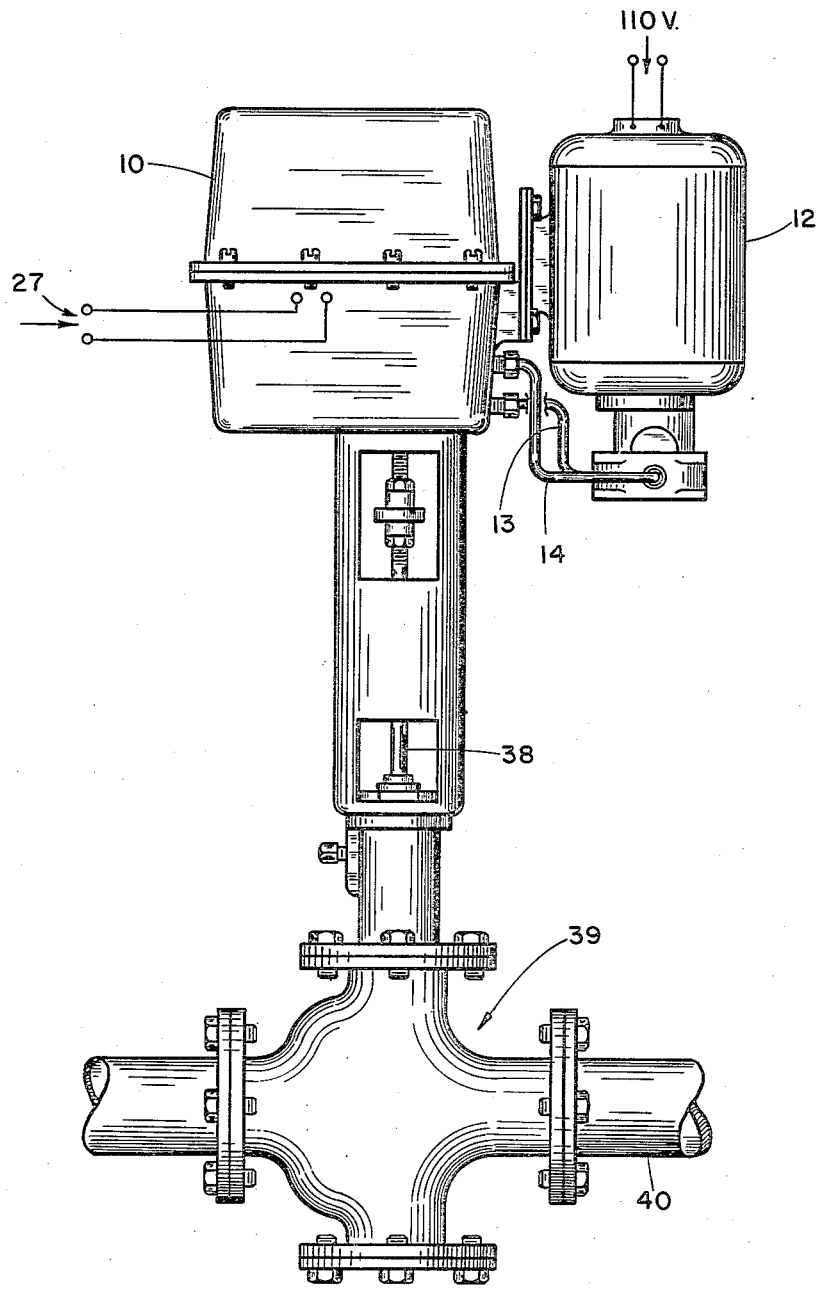
FIG. II
INVENTOR
LYMAN COOK

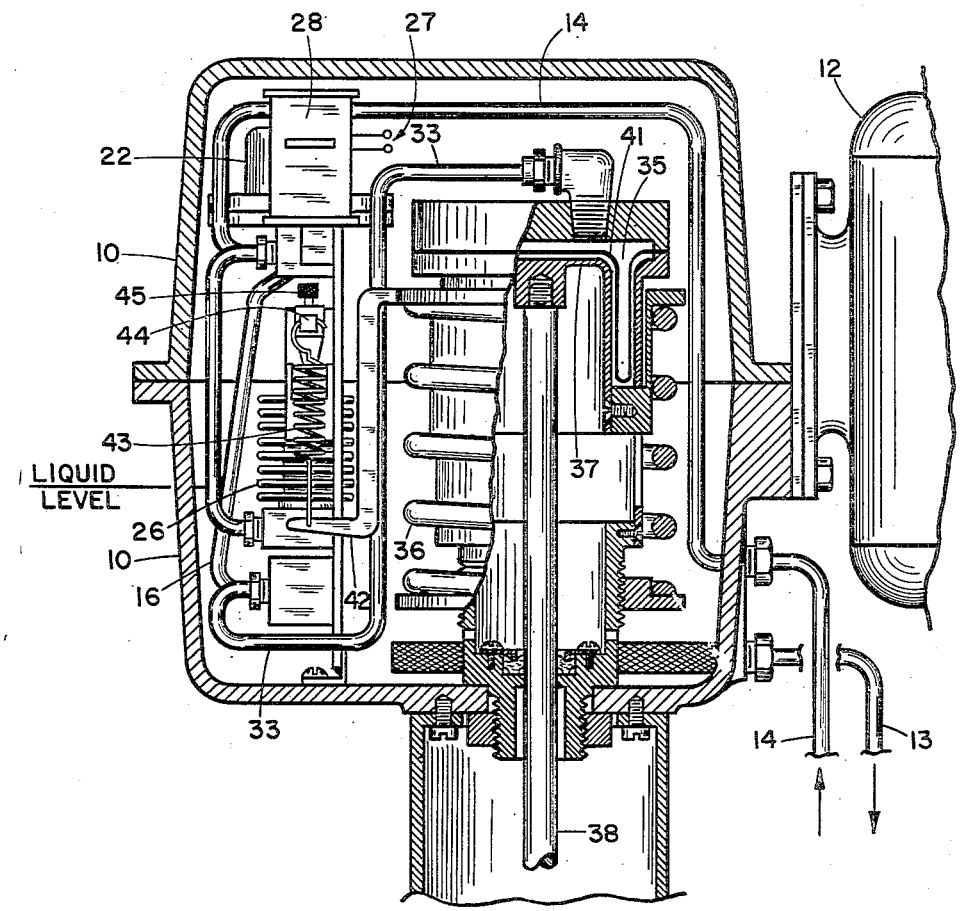
FIG. III

United States Patent Office 2,827,020
Patented Mar. 18, 1958

2,827,020

HYDRAULIC VALVE POSITIONING SYSTEM WITH VALVE POSITION FEEDBACK

Lyman Cook, Foxboro, Mass., assignor to The Foxboro Company, Foxboro, Mass., a corporation of Massachusetts Application October 11, 1956, Serial No. 615,391

2 Claims. (Cl. 121—41)

This invention relates to systems for positioning a control valve in accordance with an operating signal, and has particular reference to such systems wherein intelligence with respect to the actual position of the valve is fed back to modify the operating signal as applied to the control valve.

In many instances, it is desirable to locate a control valve in remote and relatively inaccessible locations such as water stations or gas or oil transmission lines, and for this purpose it is desirable to have a self-contained valve operating unit which, for example, may be powered simply by a pump located with the valve and operated by an input signal to control the valve, with the signal in any of the usual forms, for example, an electrical signal transmitted over a substantial distance. In an illustration of this invention for these purposes, an electric pump is used to operate a self-contained hydraulic system which is utilized to operate the valve and associated with which there is a valve position feedback arrangement, the whole being actuated in accordance with an electrical input signal.

This invention provides in such a hydraulic system, a hydraulic jet force transfer arrangement, a system with multiple feedback arrangements, and a new and useful system arrangement for the exact positioning of a valve in response to a control signal.

It is therefore an object of this invention to provide a new and improved hydraulic system for valve positioning.

Other objects and advantages of this invention will be in part apparent and in part pointed out hereinafter, and in the accompanying drawings, wherein:

Figure I is a schematic showing of an illustrative embodiment of this invention;

Figure II is a front elevation of an actual structure embodying the system of Figure I;

Figure III is a showing of the hydraulic system structure of Figure II, taken in the same viewing direction as is Figure II and shown in partial vertical central section;

Figure IV is another view of the hydraulic system structure of Figures II and III taken in partial vertical section with the viewing direction from the left in Figure II;

Figure V is a plan view enlargement of the hydraulic jet nozzle arrangement and structure of Figures I and IV; and Figure Va is an elevation of the nozzle showing of Figure V.

The hydraulic valve positioning system which is shown in Figure I as an illustrative embodiment of this invention includes a container 10 with a body of oil 11 therein. In the development of this system as a unitary self-contained arrangement a pump 12 is used to draw oil from the body 11 through an outlet pipe 13 into the pump 12 and from there to force the oil, under operating conditions, back into the system through a pipe 14. Adjacent the entrance of the pipe 14 to the housing 10 there is a piping branch 15 with one pipe 16 leading therefrom to terminate in a jet nozzle 17, with this nozzle 17 arranged for pivotal action in the plane of the drawing of Figure I and about a fixed pivot 18. A connector lever 19 is provided as a means of moving the jet pipe 17 about its pivot 18 and is pivotally connected to the jet pipe 17 as at 20. The other branch of the hydraulic input line is indicated at 21 and leads, through a pressure reducer 22 and a fixed restrictor 23, to a hydraulic bleed nozzle 24, as well as to a feedback bellows 25 which is associated with the bleed nozzle 24, and finally to a force bellows 26 in termination of this branch of the hydraulic operating pipeline.

In this particular system, as an illustration of this invention, the input signal is electric and is applied through electrical leads 27 to a solenoid 28. The solenoid 28 is designed, constructed, and arranged to operate in such a manner as to provide electromagnetic force in direct proportion to the electrical input signal. Arranged with respect to the electromagnetic solenoid 28, in operational relation therewith, a movable baffle arm 29 which is pivoted as at 30 for movement toward and away from both the electromagnet 28 and the previously mentioned hydraulic bleed nozzle 24. A further relation of this movable baffle 29 is with respect to the previously mentioned feedback bellows 25. The bellows 25 is arranged to move the baffle 29 away from the bleed nozzle 24 and toward the solenoid 28 upon expansion of the bellows 25, such expansion occurring upon the increase of feedback pressure from the nozzle 24 when that nozzle is increasingly blocked by movement of the baffle 29 theretowards.

The initial action of this system therefore, involves first the application of an input electrical signal through the leads 27 to the solenoid 28. The arrangement of the magnetic flux and the baffle 29 is such that an increase in signal in the solenoid results in movement of the baffle 29 toward the nozzle 24 in an action of increasing the closing of the nozzle 24 and thus increasing the liquid back pressure from the nozzle 24. Thus an increased signal to the solenoid 28 results in an increased hydraulic back pressure from the nozzle 24 and increased pressure in the feedback bellows 25. The consequent expansion of the bellows 25 provides a tendency to again move the baffle 29 away from the nozzle 24 in a feedback balancing action which results in an output hydraulic pressure from the nozzle 24, which is directly proportional to the electrical input signal.

In consequence of the initial action, as indicated above, the hydraulic pressure in the force bellows 26 is also increased in proportion to the electrical input signal with resultant expansion of the force bellows 26. A pivoted arm 31 is mounted transversely of the force bellows 26 and in engagement therewith with one end pivoted at 32 and the other end to the previously mentioned connection arm 19 which is itself operatively connected to the jet pipe 17 at 20. This arrangement is such that the increase of the expansion of the force bellows 26 results in a slight upward movement of the arm 31, and in consequence the jet pipe 17 also moves slightly upward to a degree which is directly representative proportional to the electrical input signal to the solenoid 28.

It should be noted that the jet pipe 17 is submerged substantially below the surface of the body of oil 11 so that the jet transfer is accomplished without any spraying effect or without any drawing in of impurities or air which would be liable to produce an error in the operation of the remainder of the system. A jet receiving pipe 33 is mounted in end to end facing relationship with the jet pipe 17 with a small gap therebetween so that the jet pipe 17 may be moved without contacting the jet receiving pipe 33. The operation of this section of this system is for a jet of oil to be transmitted from the jet pipe 17 into the jet receiving pipe 33 with the amount of force thus transmitted depending upon the relative alignment of the two pipe ends thus facing each other. Full force is obtained with exact alignment and as the jet pipe 17 is moved transversely of the receiving pipe 33 in the operation of this system, the force transmitted is in a lesser degree and is representative of the input electrical signal to the solenoid 28.

The hydraulic force in the jet receiving pipe 33 is used to operate a control valve indicated generally at 34, with this jet receiving pipe 33 leading into an upper chamber 35 of the control valve. This is a spring biased valve with reference to the action of the coil spring 36 which tends to move a valve head unit 37 upwards. A valve stem 38 is secured to this valve head and moves with it to operate an actual valve porting arrangement 39 in a pipeline 40. The biasing action of the spring 36 in the valve 34 is in opposition to whatever hydraulic pressure is applied to the valve in the upper chamber 35, and a flexible "hat" type diaphragm 41 is used as a dividing wall in definition of the upper chamber 35. Thus as the jet pipe 17 is more nearly aligned with the receiver pipe 33, a greater hydraulic pressure is applied within the valve chamber 35 and the valve head 37 is moved downward. Then as the jet pipe 17 is placed in disalignment with the receiver pipe 33 the hydraulic pressure in the valve chamber 35 is reduced and the bias spring 36 moves the valve head unit 37 and the stem 38 upwards with the consequent desired action with respect to the valve porting arrangement 39 thus being accomplished.

This invention is concerned with the feature, among others, of a valve position feedback action which is applied as a modification of the input operating force which is applied to the valve 34 through the hydraulic jet system. This valve position feedback system comprises a fixed arm 42 which is secured to the valve head 37 and moves therewith up and down. This feedback system is a force balance system and in the accomplishment of this purpose a coil spring 43 has one end secured to the valve head arm 42 and the other end secured thereabove to the outer end of a feedback arm 44 which is pivoted at its inner end at a fixed location 44'. This feedback arm is mechanically related to the previously mentioned arm 31 through a double edged movable pivot unit 45. That is, the arm 44 rests on and moves about the pivot 45 on the top thereof, and the bottom of the pivot unit 45 is applied to the arm 31 in transference of motion and/or force from the arm 44 to the arm 31. This pivot unit 45 is adjustable lengthwise of the arms 44 and 31 to vary the relative leverages of these arms.

Thus the movement of the arm 31 as initiated by the electrical input signal, as a means of slightly moving the jet pipe 17 in alignment variation with respect to the receiver pipe 33, is modified by the feedback action of the arm 44 as produced in a force balance action from the actual valve position through the feedback force spring 43.

This invention is accordingly provided with a single pair of opposed jet transmitter and receiver pipes and with a one-sided application of hydraulic force to the operation of a spring biased hydraulic control valve. It may be noted that the entire system as illustrated in Figure I comprises a combination of two feedback systems and that it also comprises two hydraulic pressure systems of substantially different force ranges operated from a single pressure source, that is, pump 12; and that the entire system is unitary and self contained and disposable in remote and inaccessible areas, needing only some means of providing power to pump 12 such as electrical means indicated at 12', for its operation with respect to an input signal which is applied electrically to the solenoid 28.

A particular feature of this illustration has to do with the hydraulic jet arrangement. With reference to Figure V it will be seen that the jet pipe structure of Figures I and IV involves jet pipe transmission and receiving ends which are rectangular and relatively long and narrow. These rectangles are operated transversely of each other so that full on to full off position range involves merely the movement of the jet pipe 17 across the width of a narrow rectangle. This arrangement provides substantially greater linearity than ordinary two-circle eclipsing arrangement, and has the advantage of providing a very small movement, in effect a force balance movement, from full on to full off over what can nonetheless be a substantial range of force application to the control valve 34.

It may be noted, with respect to the jet pipe arrangement of this device, that there is no contact between the transmitter and receiver pipe so that there is no friction involved such as is met in prior art systems of the slide valve type.

Figures II, III, IV, and V are showings of an actual structure involving the system of Figure I and since the parts are at least functionally the same, the reference numerals of Figure I have been applied to Figures II, III, IV, and V, and are believed to be sufficient for parts identification and system operation explanation with reference to the hereinbefore explanation of Figure I.

This invention, therefore, provides a new and improved hydraulic control valve operating system including a valve position feedback arrangement.

As many embodiments may be made of the above invention and as changes may be made in the embodiments set forth above without departing from the scope of the invention, it is to be understood that all matter hereinbefore set forth or shown in the accompanying drawings is to be interpreted as illustrative only and not in a limiting sense.

I claim:

1. A valve positioning hydraulic jet system wherein a controlled input signal is applied to the valve and a feedback signal representative of the valve position is fed back and used to modify the input signal, said system comprising, in combination, an electro-hydraulic input signal system comprising an electromagnet for receiving an electrical signal, a liquid nozzle-baffle control device arranged with said baffle movable with respect to said nozzle by varying signals in said electromagnet, means including a bellows arranged to move said baffle in opposition to the electromagnetic movement thereof, a connection from said nozzle to said bellows as a means of applying the back pressure of said nozzle to said baffle, means for applying the output back pressure of said nozzle to a second bellows as the operating output of said liquid nozzle-baffle device in representation of the electrical input signal as applied to said electromagnet, means for applying said input signal as represented by said second bellows movement to the operation of a valve comprising a spring biased hydraulic valve motor and a valve stem movable by said motor, a single liquid jet receiving pipe for applying hydraulic force to said motor against said spring bias, a single liquid jet supplying pipe in end facing relation with said jet receiving pipe and movable transversely thereof in accordance with the movement of said second bellows to vary the degree of jet force transfer between said jet supply pipes, means for tending to produce said transverse movement of said jet supply pipe in response to a change in said electrical input signal, with said last named means including said second bellows of said input device, variable force resilient means for opposing said tendency to produce a transverse movement, and a connection between said jet supply pipe and said valve stem including said resilient means, whereby said opposition is in variable force representation of the position of said valve stem.

2. A position feedback electro-hydraulic valve positioning hydraulic jet system wherein a valve is positioned in accordance with an electrical input signal and wherein a representation of the valve position is fed back to modify the positioning force as applied to the valve, said system comprising, in combination, a variable condition input signal receiving electromagnet, a hydraulic nozzle-baffle device operable by said electromagnet and including a nozzle back pressure bellows arranged to supply a balancing force to said nozzle-baffle arrangement with respect to the action of said electromagnet thereon, an operating bellows for receiving the output pressure of said nozzle-baffle device, a lever movable by said output bellows in representation of said electrical input signal, a movable hydraulic jet pipe, a connection from said first lever to said jet pipe, a jet receiving pipe in end facing relationship with said jet pipe and arranged to be variably eclipsed thereby, a hydraulic valve operating motor arranged to receive and respond to the hydraulic force produced in said jet receiving pipe by a liquid jet from said jet pipe, a valve stem movable in response to the operation of said valve motor, a rigid arm fixed to said valve stem and extending laterally therefrom, a second lever mounted in adjacency with said first lever, a force spring connecting said second lever and said valve stem lateral arm, a rigid connection between said second lever and said first lever, whereby a force in representation of the position of said valve stem is applied to said first lever with respect to its tendency to move said jet pipe in a modification of the initial tendency of said second bellows to move said jet pipe, said end faces of said jet and jet receiving pipes being in the form of relatively long and narrow rectangles with the longitudinal axes of these rectangles in parallel throughout the movement of said jet pipe with respect to said jet receiving pipe and arranged for eclipsing movement in the direction of the transverse axes of said rectangular pipe end faces, said system being self-contained with respect to its hydraulic arrangement, said arrangements including an enclosure, an operating body of oil in said enclosure, an electrically operated oil pump for drawing oil from said operating body, means for directing a reduced pressure portion of the output of said oil pump to said input nozzle, and means for directing another portion of the output of said oil pump to said jet pipe, said enclosure being arranged to receive the liquid bled from said input section nozzle, and said end facing portions of said jet supplying and receiving pipes being submerged in said body of oil whereby said hydraulic jet is operated in an ambiency of oil, said entire system thereby comprising an arrangement of transfer of electrical to mechanical to hydraulic forces with a feedback from said hydraulic to said mechanical, a further transfer from hydraulic to mechanical and again to hydraulic forces with a final transfer from said last named hydraulic force to a valve stem positioning action with a feedback from said valve stem position to said second mechanical action.

References Cited in the file of this patent

UNITED STATES PATENTS

| | | |
|---|---|---|
| 368,089 | Hinds | Aug. 9, 1887 |
| 2,104,627 | Manteuffel | Jan. 4, 1938 |
| 2,179,450 | Gorrie | Nov. 7, 1939 |
| 2,228,015 | Neukirch | Jan. 7, 1941 |
| 2,269,072 | Wilde | Jan. 6, 1942 |
| 2,588,988 | Robins | Mar. 11, 1952 |
| 2,672,150 | Benedict | Mar. 16, 1954 |
| 2,789,543 | Popowsky | Apr. 23, 1957 |

FOREIGN PATENTS

| | | |
|---|---|---|
| 1,042,859 | France | June 10, 1953 |